US011902175B1

(12) United States Patent
Sydney et al.

(10) Patent No.: US 11,902,175 B1
(45) Date of Patent: Feb. 13, 2024

(54) ALLOCATING BANDWIDTH TO COMMUNICATION PATHS USED BY NODES IN A NETWORK

(71) Applicant: INTERNATIONAL BUSINESS MACHINES CORPORATION, Armonk, NY (US)

(72) Inventors: Ali Sydney, Pepperell, MA (US); Md Abdul Alim, White Plains, NY (US); Bengi Karacali-Akyamac, Somerset, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/189,947

(22) Filed: Mar. 24, 2023

(51) Int. Cl.
*H04L 47/76* (2022.01)
(52) U.S. Cl.
CPC .................... *H04L 47/76* (2013.01)
(58) Field of Classification Search
CPC ...................................................... H04L 47/76
See application file for complete search history.

(56) References Cited

U.S. PATENT DOCUMENTS

| 6,011,776 A * | 1/2000 | Berthaud | ............ H04L 12/5602 370/232 |
| 8,179,786 B2 * | 5/2012 | Hafid | .................... H04L 45/247 370/395.5 |
| 10,069,570 B2 | 9/2018 | Djukic et al. | |
| 10,587,698 B2 | 3/2020 | Dunbar et al. | |
| 10,833,995 B2 | 11/2020 | Liao et al. | |
| 10,868,737 B2 | 12/2020 | Huang et al. | |
| 2002/0141341 A1 * | 10/2002 | Haggar | .................... H04L 47/11 370/232 |
| 2002/0154622 A1 * | 10/2002 | Hammel | ............... H04W 16/12 370/348 |
| 2015/0181465 A1 * | 6/2015 | Dao | .................. H04W 28/0284 370/235 |

(Continued)

FOREIGN PATENT DOCUMENTS

CN        105227481 A       1/2016

OTHER PUBLICATIONS

Alizadeh, et al., "Data Center Transport Mechanisms: Congestion Control Theory and IEEE Standardization", IEEE, 2021, 8 pp.

(Continued)

*Primary Examiner* — Azizul Choudhury
(74) *Attorney, Agent, or Firm* — KONRAD RAYNES DAVDA & VICTOR LLP; David W. Victor

(57) ABSTRACT

Provided are a computer program product, system, and method for allocating bandwidth to communication paths used by nodes in a network. A request is received from a source node of the nodes to communicate with a destination node. A path is selected between the source node and the destination node. A determination is made of a per path allocated bandwidths for links in the selected path based on a number of common paths that share a link with the selected path. Allocated bandwidth for the selected path is set to a minimum of the per path allocated bandwidths for the links in the selected path. Information on the selected path and the allocated bandwidth is transmitted to the source node to use to communicate with the destination node.

20 Claims, 7 Drawing Sheets

(56) References Cited

U.S. PATENT DOCUMENTS

2016/0344615 A1* 11/2016 Hao ................... H04L 45/122

OTHER PUBLICATIONS

A. Khan, "Intelligent Load Balancing Over Fabric Path in Data Center", IP.com, IP.com No. PCOM000240717D, Feb. 20, 2015, 10 pp.

"A System and Method for Software Defined Congestion Controlled Reliable Multicast Communication in the Cloud", IP.com, IP.com No. IPCOM000246048D, Apr. 29, 2016, 12 pp.

"Cooperating Overlay and Underlay Controllers for Cloud Network Traffic Engineering", IP.com , IP.com No. IPCOM000270551D, Jul. 14, 2022, 8 pp.

Li, et al., "REN: Receiver-Driven Congestion Control Using Explicit Notification for Data Center", IEEE Transactions on Cloud Computing, 2021, 14 pp.

Xue, et al., "Fast Congestion Control in RDMA-Based Data Center Networks", ACM, 2018, 3 pp.

Zhang, et al., "HIERCC: Hierarchical RDMA Congestion Control", ACM, 2021, 8 pp.

Clark, et al., "The Design Philosophy of the DARPA Internet Protocols", ACM, Proc. SIGCOMM '88, Computer Communication Review vol. 18, No. 4, Aug. 1988, pp. 106-114.

Cerf, et al., "Specification of Internet Transmission Control Program", Network Working Group, Dec. 1974, 70 pp.

Eddy, "Transmission Control Protocol (TCP)", IETF Trust, 2022, 98 pp.

Alizadeh, et al., Data Center TCP (DCTCP), ACM, SIGCOMM'10, Aug. 30-Sep. 3, 2010, 12 pp.

Cardwell, et al., "BBR Congestion Control", IETF Trust, 2022, 56 pp.

Li, et al., "HPCC: High Precision Congestion Control", ACM, SIGCOMM '19, Aug. 19-23, 2019, 15 pp.

Kumar, et al., "Swift: Delay is Simple and Effective for Congestion Control in the Datacenter", ACM, SIGCOMM '20, Aug. 10-14, 2020, 15 pp.

"InfiniBandTM Architecture Specification vol. 1", InfiniBand Trade Association, Release 1.2.1, Nov. 2007, 1727 pp.

"RoCE Introduction", RoCE, 3 pp., [onlne][retrieved Mar. 3, 2023] https://www.roceinitiative.org/roce-introduction/ retrieved Mar. 3, 2023.

"Fibre Channel Buffer Credits and Frame Management", Brocade, White Paper, 20 pp.

"Priority-based Flow Control", IEEE, 8 pp., [onlne][retrieved Mar. 3, 2023] https://1.ieee802.org/dcb/802-1qbb/.

Cho, et al., "Credit-Scheduled Delay-Bounded Congestion Control for Datacenters", ACM, SIGCOMM '17, Aug. 21-25, 2017, 14 pp.

Bosshart, et al., "P4: Programming Protocol-Independent Packet Processors", ACM SIGCOMM Computer Communication Review, vol. 44, No. 3, Jul. 2014, 8 pp.

Geng, et al., P4QCN: Congestion Control Using P4-Capable Device in Data Center Networks, MDPI, Electronics 2019, 17 pp.

F-DCTCP: Fair Congestion Control for SDN-Based Data Center Networks for SDN-Based Data Center Networks, IEEE, 2019, 8 pp.

Bao, et al., "ECTCP: An Explicit CentrM. ALIZADEHalized Congestion Avoidance for TCP in SDN-based Data Center", IEEE, 2018 IEEE Symposium on Computers and Communications (ISCC), 2018, 7 pp.

Lu, et al., "SDN-based TCP Congestion Control in Data Center Networks", IEEE, 2015, 7 pp.

Ghalwash, et al., "A congestion control mechanism for SDN-based fat-tree networks", IEEE, 2020, 7 pp.

Al-Fares, et al., "Hedera: Dynamic Flow Scheduling for Data Center Networks", Berkeley University, 2010, 15 pp.

Alizadeh, et al., "CONGA: Distributed Congestion-Aware Load Balancing for Datacenters", ACM, SIGCOMM'14, Aug. 17-22, 2014, 12 pp.

"Software-defined networking" Wikipedia, 11 pp., [online][retrieved Mar. 12, 2023] https://en.wikipedia.org/wiki/Software-defined_networking.

* cited by examiner

ALLOCATING BANDWIDTH TO COMMUNICATION PATHS USED BY NODES IN A NETWORK

BACKGROUND OF THE INVENTION

1. Field of the Invention

The present invention relates to a computer program product, system, and method for allocating bandwidth to communication paths used by nodes in a network.

2. Description of the Related Art

Management of network bandwidth allocation involves consideration of flow control and congestion control. When a source node transmits faster than a destination node can accept, flow control provides a mechanism that the destination node can use to request that the source node slows transmission until the destination node can accept. Congestion occurs when more traffic intends to traverse a link than the link can accommodate. Congestion control provides mechanisms to identify and alleviate congestion.

The management of flow control and congestion control can be handled through a centralized manager or server or in a decentralized manner where nodes communicate with each other to control the flow and avoid congestion. In a decentralized environment, for flow control, the destination node communicates with a source node to transmit no more than the destination node can process. For congestion control, the source node may estimate available capacity on the path to the destination node and, if congestion occurs, the source slows transmission.

Data centers today are gravitating towards support of a large user-base, workloads that require huge datasets, and applications that require low latency and high throughput. To meet these demands, the supporting infrastructure has evolved into distributed compute and disaggregated storage blocks to maintain high network performance.

There is a need in the art for improved techniques to manage flows and congestion control in a network of communicating nodes.

SUMMARY

Provided are a computer program product, system, and method for allocating bandwidth to communication paths used by nodes in a network. A request is received from a source node of the nodes to communicate with a destination node. A path is selected between the source node and the destination node. A determination is made of a per path allocated bandwidths for links in the selected path based on a number of common paths that share a link with the selected path. Allocated bandwidth for the selected path is set to a minimum of the per path allocated bandwidths for the links in the selected path. Information on the selected path and the allocated bandwidth is transmitted to the source node to use to communicate with the destination node.

DETAILED DESCRIPTION

Described embodiments provide improvements to computer network technology to manage flow control and the allocation of bandwidth to communication paths between source and destination nodes to avoid congestion on all links. In particular, embodiments provide a hierarchical approach with two layers: The inter-node layer allocates bandwidth between nodes and the intra-node layer allocates bandwidth for flows within a node. Described embodiments ensure that when allocating bandwidth to a path, the bandwidth for the path will not exceed the minimum per path allocated bandwidth for a link for all paths that use that link. As a result, transmission on paths that share a link will not exceed the bandwidth capacity for that link. Furthermore, congestion control is prevented or at least minimized on any link in the network when that link may be shared by any number of paths between source and destination nodes in the network.

The path and bandwidth allocated to a path to avoid network congestion is transmitted to the source node. The bandwidth allocated is used as an upper-bound of the transmission rate on a path to a destination node. The transmission rate at the source node specifies how much of that bandwidth is used. If a source node does not fully utilize all allocated bandwidth on a path to the destination node, then the source node may communicate the transmission rate to the network manager. The network manager may increase the allocated bandwidth for all sources traversing the same path, if such increase will not exceed the per path allocated bandwidth. This ensures redistributing available bandwidth will not exceed the minimum per path allocated bandwidth. When allocating bandwidth, a centralized network manager ensures that the transmission rate at source nodes is the minimum of the available capacity on all links to the destination and does not exceed the capacity of the destination node. Further, the source node enforces the transmission rate and path provided by the network manager. This results in a lossless and congestion free fabric.

Certain embodiments provide a layered hierarchical approach that capitalizes on the high degree of parallelism in a network topology to provide full bisection bandwidth among host nodes and alleviates the need for distributed flow control mechanisms and the burden to manage and tune distributed congestion control mechanisms. To foster scalability, the described embodiments allow the solution of allocating bandwidth to paths at the inter-node layer to be re-used at the intra-node layer due to the self-similar nature of the workflow.

The described embodiments provide a congestion free and lossless fabric, realizes a solution agnostic to the underlying switch fabric, and is decoupled from upper-layer protocols (e.g., Transmission Control Protocol (TCP)). Additionally, described embodiments provide a node driven approach that enforces bandwidth allocations to paths used by a node to control transmission rates.

Figure 1:
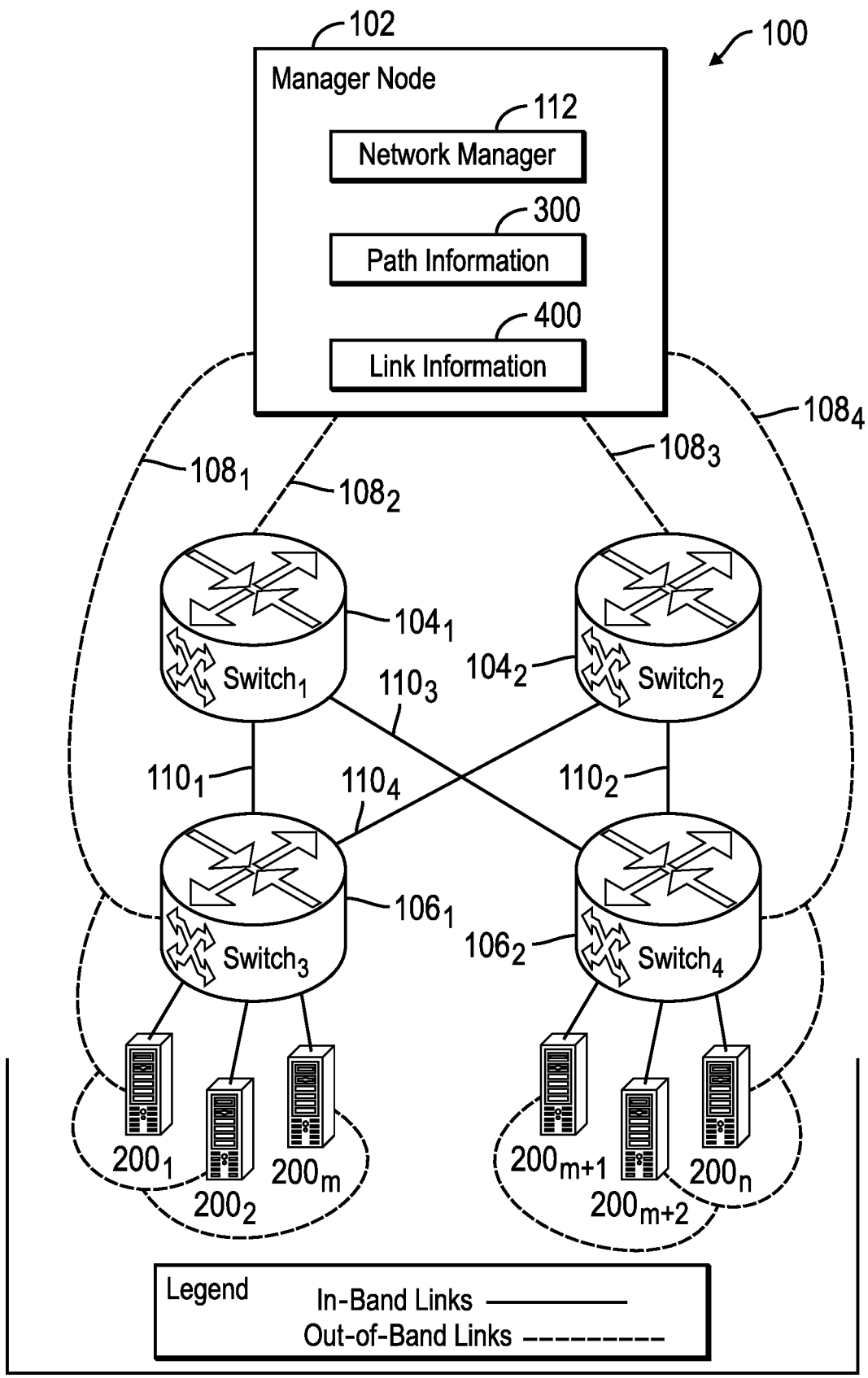
FIG. 1 illustrates an embodiment of a network computing environment.

FIG. 1 illustrates an embodiment of a network computing environment 100 to manage flow and congestion control. The network 100 comprises a manager node 102 that communicates directly with network components, comprising switches $104_1$, $104_2$, $106_1$, $106_2$ to computing nodes $200_1 \ldots 200_m$, $200_{m+1} \ldots 200_n$, over out-of-band network links $108_1$, $108_2$, $108_3$, and $108_4$. The network components are connected via network links $110_1$, $110_2$, $110_3$, $110_4$ to form a network topology. The network topology in FIG. 1 comprises an example of a network topology and there may be any number of switches, nodes, and links between switches and nodes.

The manager node 102 includes a network manager 112 to manage flow and congestion control among the nodes $200_1 \ldots 200_n$ to eliminate network congestion. The network manager 112 maintains path information 300 on paths between source nodes and destination nodes and link information 400 on all links in the network topology.

Figure 2:
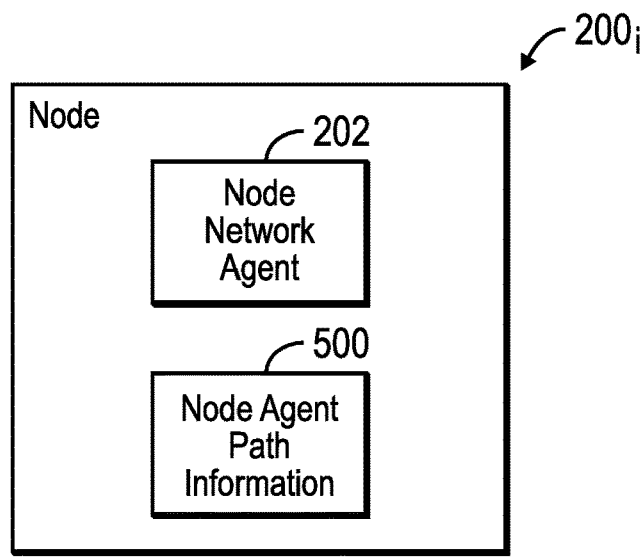
FIG. 2 illustrates an embodiment of a node in the network.

FIG. 2 illustrates an embodiment of a node $200_i$ in the network and includes a node network agent 202 to interface with the network manager 112 to manage allocated bandwidth on paths to destination nodes. The node network agent 202 maintains node agent path information 500 that includes communication paths and allocated bandwidth.

In certain embodiments, the network manager 112 and node network agents 202 may leverage a Software Defined Network (SDN) framework. In this framework, the network manager 112 comprises a logically centralized SDN controller that is responsible for obtaining the topology of the network and bandwidth constraints from node network agents 202 in nodes $200_i$. Further, the SDN controller manages traffic flow to avoid network congestion and provides the node network agents 202 with an abstract view of the network. The network manager 112 provides a software layer for network traffic management that is independent of the transport, network, and data link layer protocols. The node network agents 202 may comprise SDN applications that communicate their network constraints to the network manager 112, i.e., SDN controller, and consume an abstracted view of the network for internal decision purposes.

The program components of FIGS. 1 and 2, including components 112, 202 may comprise program code loaded into a memory and executed by one or more processors. Alternatively, some or all functions may be implemented as microcode or firmware in hardware devices, such as in Application Specific Integrated Circuits (ASICs).

The networks 108 and 110 may comprise a Storage Area Network (SAN), a Local Area Network (LAN), a Wide Area Network (WAN), the Internet, and Intranet, peer-to-peer network, direct communication paths, etc.

Figure 3:
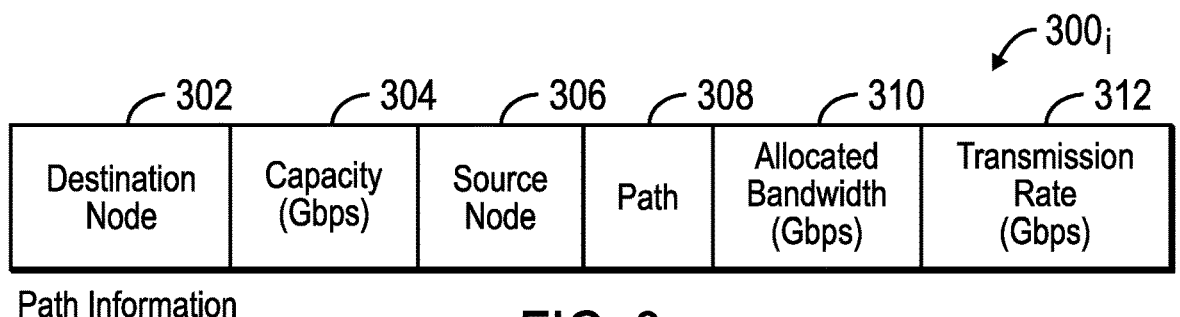
FIG. 3 illustrates an embodiment of path information on a path between a source node and destination node.

FIG. 3 illustrates an embodiment of an instance of path information $300_i$ in the path information 300, and includes or identifies: a destination node 302 to receive communications from a source node 306; a total capacity 304 in gigabytes per second (Gbps) for the path 308, where the path is identified by a source node, links and/or switches that connect to a destination node, where the components are listed in the order in which they are located in the path; an allocated bandwidth (Gbps) 310 allocated to the path 308 as determined by the network manager 112; and an actual transmission rate (Gbps) 312.

Figure 4:
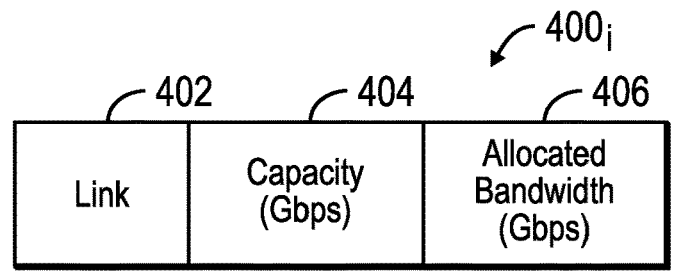
FIG. 4 illustrates an embodiment of link information on a link in the network.

FIG. 4 illustrates an embodiment of an instance of link information $400_i$ in the link information 400 and includes or identifies: a link 402; a total available capacity (Gbps) 404 on the link 402; and allocated bandwidth (Gbps) 406 on the link, which may be less than the capacity 404 to retain some bandwidth for control/management plane communications.

Figure 5:
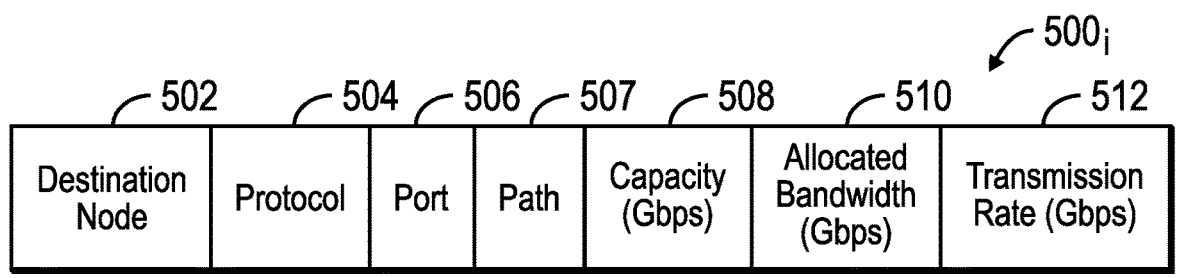
FIG. 5 illustrates an embodiment of node agent path information maintained at nodes for paths used to destination nodes.

FIG. 5 illustrates an embodiment of an instance of node agent path information $500_i$ in node agent path information 500 maintained at each node $200_i$ for use by the node network agent 202 in each node $200_i$, and includes or identifies: a destination node 502; a protocol 504 used to communicate to the destination node 502; a network port 506 on the source node $200_i$ used to communicate to the destination node 502 on the identified path 507; total capacity (Gbps) 508 of total available bandwidth to communicate to the destination node 502 through port 506; allocated bandwidth (Gbps) 510 that is used for communication to the destination node 502 through port 506 using protocol 504; and current transmission rate (Gbps) 512 to the destination node 502 through the port 506 using protocol 504. There may be multiple instances of node agent path information $500_i$ for communications to the same destination node 502 through different ports 506 and using different network communication protocols 504.

For flow control, when a node $200_i$ connects to the network, node $200_i$ registers its capacity with the network manager 112. The network manager 112 sets the capacity 304, in the path information $300_i$ for the registering node $200_i$. When a source node sends a request to the network manager 112 for the bandwidth and path to destination node $200_D$, the network manager 112 may use the registered capacity of the destination node as an upper bound when determining capacity to allocate to the source node.

The protocols 504 may comprise Transmission Control Protocol/Internet Protocol (TCP/IP), User Datagram Protocol (UDP), and other suitable protocols known in the art.

Figure 6:
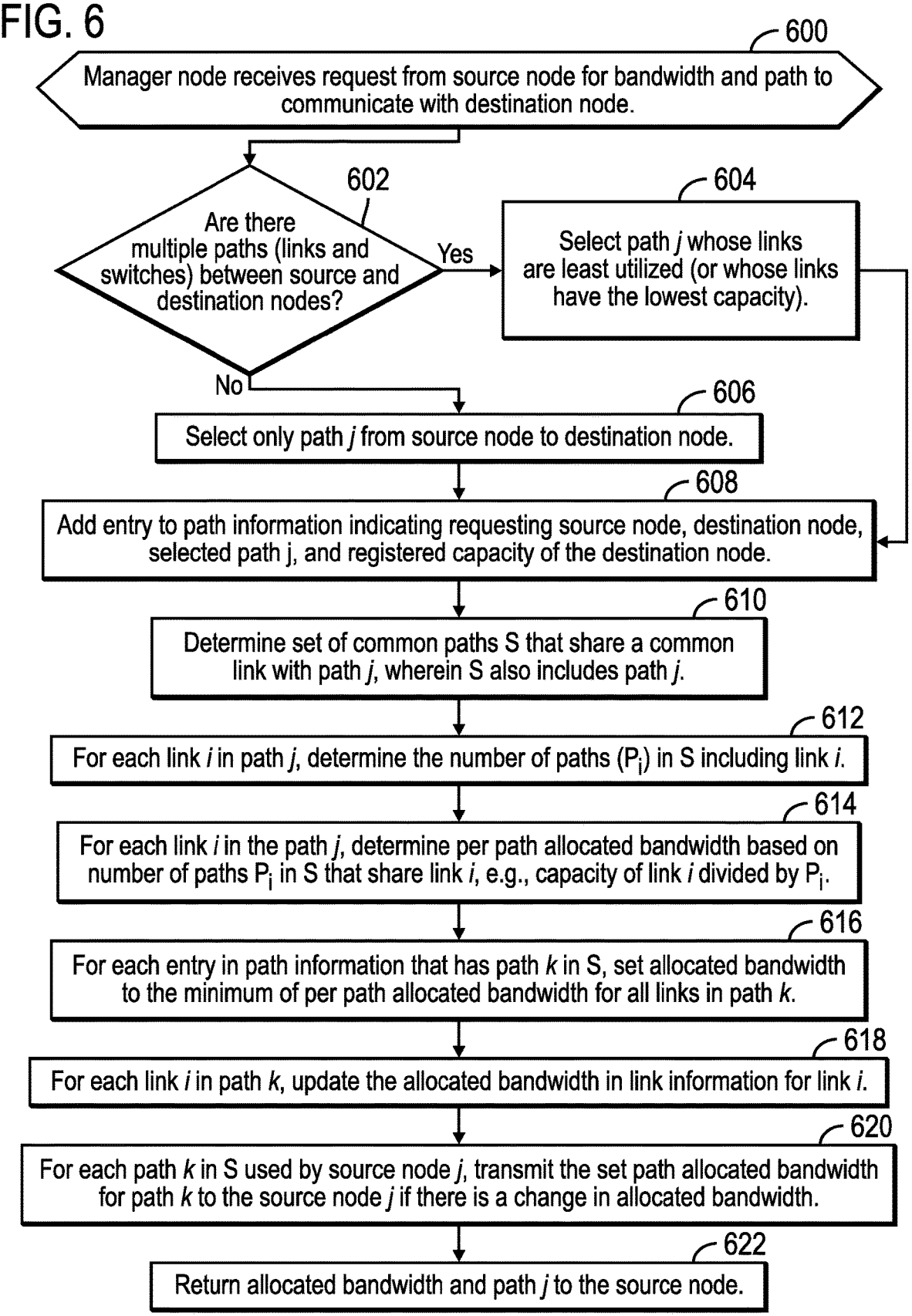
FIG. 6 illustrates an embodiment of operations at the manager node to add an entry to the path information for a source to communicate with a destination node.

FIG. 6 illustrates an embodiment of operations performed by the network manager 112 to establish a communication path between a source node and destination node and allocate bandwidth in a manner that prevents network congestion. Upon receiving a request (at block 600) from a requesting source node $200_i$ to communicate with a destination node, the network manager 112 determines (at block 602) whether there are multiple distinct paths (links and switches) between the source node and the destination node. If (at block 602) there are multiple distinct paths, then a path j is selected (at block 604) whose links are least utilized, e.g., whose links have the lowest capacity. If (at block 602) there is only one path from the requested source node to the destination node, then that only path j is selected. After selecting a path j (at block 604 or 606) in the topology, an entry $300_i$ is added (at block 608) to the path information $300_i$ indicating requesting source node 306, destination node 302, selected path j 308, including links and switches in the path 308, and registered capacity 304 of the destination node, which capacity would have been set when the destination node 302 registered with the network manager 112.

A determination is made (at block 610) of common paths S that share a common link with path j, where S also includes path j. These common paths will be affected by adding path j because there will now be more source nodes communicating on links in these effected paths due to the path j being added for communication using these same links. For each link i in path j, determine (at block 612) the number of paths ($P_i$) in S including link i. For each link i in path j, determine (at block 614) the per path allocated bandwidth based on number of paths $P_i$ in S that share link i, e.g., capacity of link divided by the number of paths $P_i$. Other techniques may be used to assign available bandwidth on a link to the paths that include that link, such that there are different per path allocated bandwidths for a link.

For each entry $500_k$ that has path k in set S, including for path j, the network manager 112 sets (at block 616) allocated bandwidth to the minimum of the per path allocated bandwidth for all links in path k. For each link i in path k, update (at block 618) the allocation bandwidth 406 in the link information $400_i$ for link i. At this point, the bandwidth to be used by the source node 200i, the path the source node should use, and the updated bandwidth for all other source nodes that share links on this path has been determined. For each path k in S used by source node j, the path allocated bandwidth for path k is sent (at block 620) to the source node j if there is a change in allocated bandwidth. The allocated bandwidth and path j are returned (at block 622) to the source node $200_i$ to use to communicate with the destination node.

With the embodiment of FIG. 6, the network manager 112 selects a minimum of the per path allocated bandwidths for the links in a path to determine the allocated bandwidth for paths in a set S of paths that have common links with the path j to add. The allocated bandwidth for a particular link in the paths in set S is the capacity of link divided by the number of paths in set S of paths that share that link, including the path j being added. This avoids congestion by ensuring that the communication bandwidth for any path is the minimum of the allocated bandwidths to all links in the path.

Figure 7:
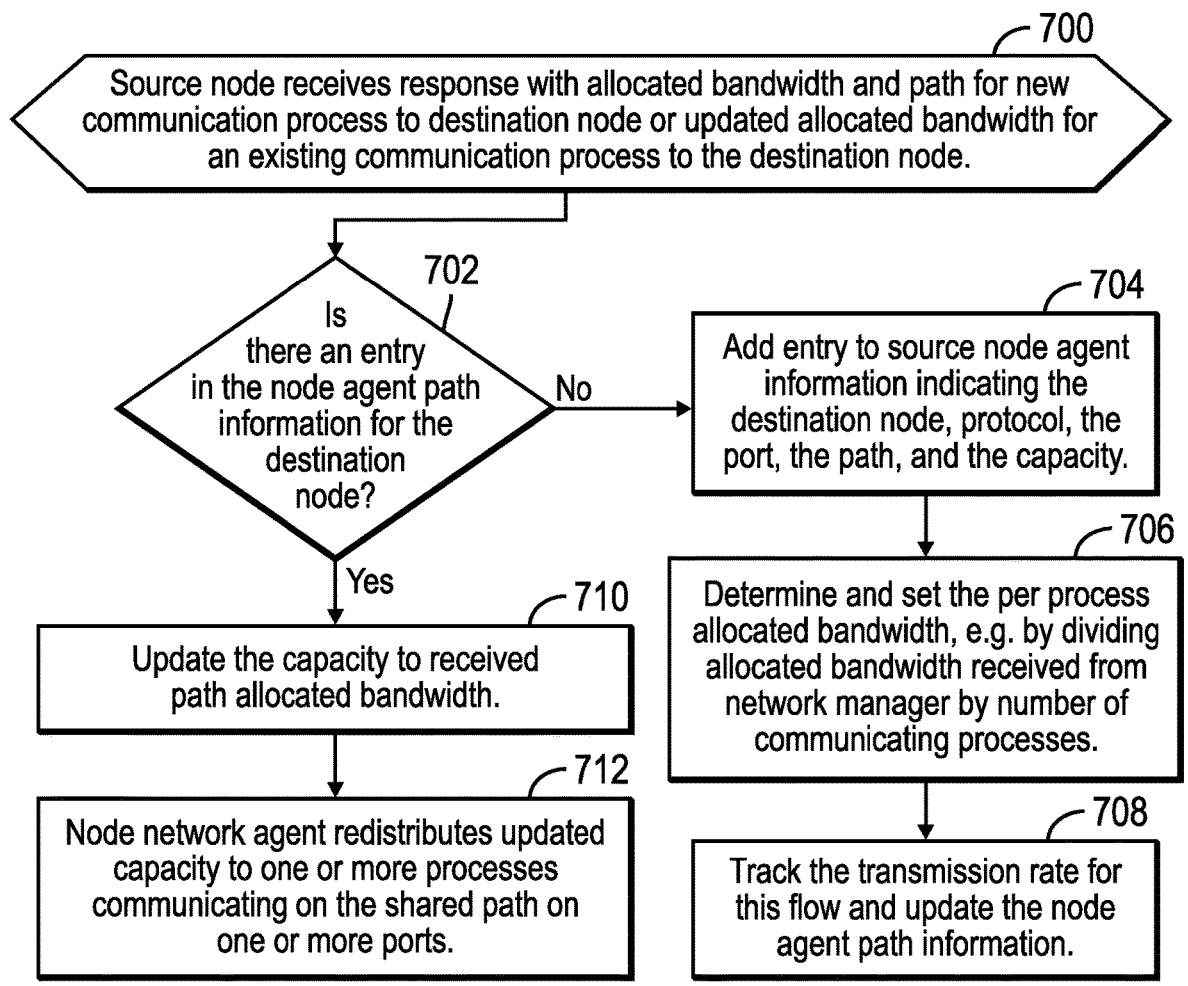
FIG. 7 illustrates an embodiment of operations performed at the source node to add an entry to the node path information for allocated bandwidth to communicate with a destination node.

FIG. 7 illustrates an embodiment of operations performed by the node network agent 202 in a node $200_i$ upon receiving a path allocated bandwidth and path to a destination node for a new communication process or upon receiving a path allocated bandwidth update to an existing communication process. Upon receiving (at block 700) a response with allocated bandwidth and path for new communication process to destination node or updated allocated bandwidth for an existing communication process to the destination node, which is returned at block 622 in FIG. 6, if (at block 702) there is no entry $500_i$ in the node agent path information 500 for the destination node, this indicates a new communication process. The node network agent leverages source routing, e.g. Segment Routing (SR), to enforce the path provided by the network manager 112. An entry $500_i$ is added (at block 704) to the source node agent path information 500 indicating the destination node, the protocol, the port, the path, and the capacity in fields 502, 504, 506, 507, and 508, respectively. The node network agent 202 may further determine and set (at block 706) the per process allocated bandwidth, e.g. by dividing allocated bandwidth received from network manager by number of communicating processes. The node network agent 202 may further track (at block 708) the transmission rate for this flow and update the transmission rate 512 in the node agent path information $500_i$.

If (at block 702) there is already an entry $500_i$ for the destination node in the node agent path information 500, this indicates an existing communication process. The node network agent 202 updates (at block 710) the capacity 508 for the path 507 to the path allocation bandwidth. The node network agent 204 redistributes (at block 712) the updated capacity to one or more processes communicating on the shared path on one or more ports on the node $200_i$.

With the embodiment of FIG. 7, the node receiving the allocated bandwidth updates node agent path information to use the received allocated bandwidth. This received bandwidth is an upper bound on the bandwidth for transmission on the path. As a result, bandwidth is allocated to a path such that if all source nodes using this path are communicating simultaneously, congestion will not occur. This is realized since all source nodes transmitting at their allocated bandwidth on links in the path will not exceed the capacity for any one link.

Figure 8:
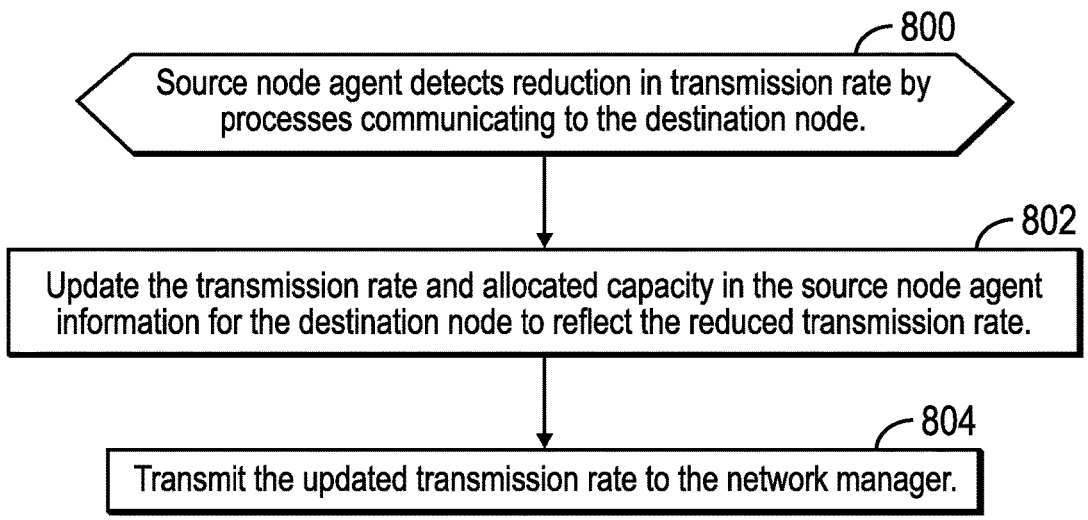
FIG. 8 illustrates an embodiment of operations at a source node to inform a network manager of the updated transmission rate so the network manager may distribute the available bandwidth to other paths between source and destination nodes in the network.

FIG. 8 illustrates an embodiment of operations performed by the node network agent 202 in a node $200_i$ upon detecting a reduced transmission rate by processes communicating to the destination node 502. Upon detecting (at block 800) a reduction in the transmission rate by processes communicating to the destination node, the node network agent 202 updates (at block 802) the transmission rate 512 and allocated capacity 508 in source node agent information $500_i$ for the destination node to reflect the reduced transmission rate. The updated transmission rate is transmitted (at block 804) to the network manager 112.

With the embodiment of FIG. 8, a node $200_i$ reports the reduced transmission rate experienced by processes communicating with the destination node to the network manager 112. This allows the network manager 112 to redistribute the available capacity from that reduced transmission rate to other current paths. Hence, available capacity is not wasted, and congestion is avoided.

Figure 9:
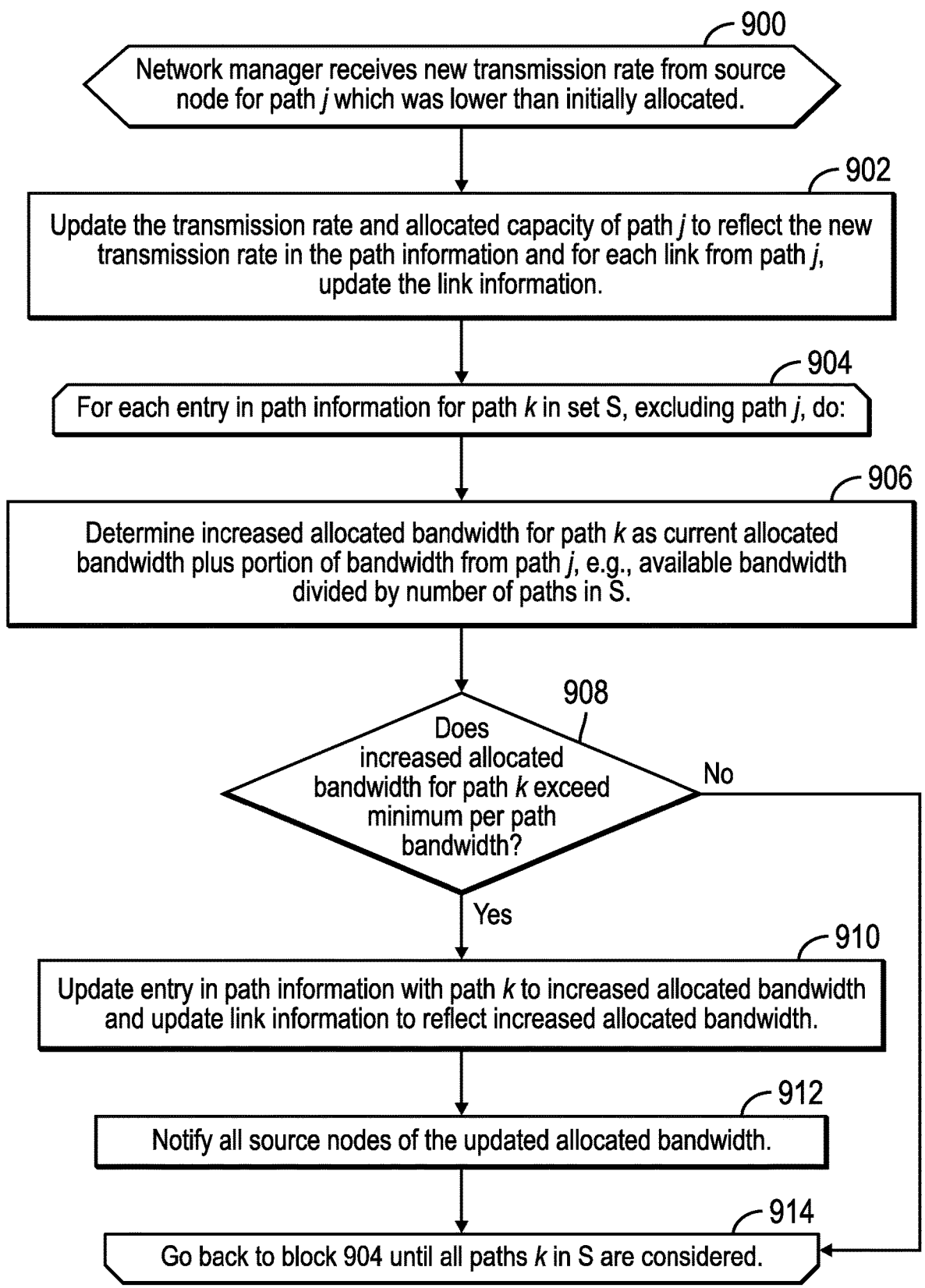
FIG. 9 illustrates an embodiment of operations at the network manager to redistribute available bandwidth from one path to other paths between source and destination nodes.

FIG. 9 illustrates an embodiment of operations performed by the network manager 112 to redistribute bandwidth from a reduced transmission rate in one node $200_i$ to the remaining paths that use the links in the path having the reduced transmission rate. Upon receiving (at block 900) a new transmission rate from a source node $200_i$ for path j which was lower than initially allocated, the network manager 112 updates (at block 902) the transmission rate 312 and allocated capacity 310 to reflect the new transmission rate in the path information. For each link i from path j, the link information 400i is updated. For each entry $300_k$ in path information for path k in set S, excluding path j, the network manager 112 performs a loop of operations at blocks 904 through 914. At block 906, the network manager 112 determines increased allocated bandwidth for path k as current allocated bandwidth 310, indicated in path information $300_k$ for path k, plus a portion of bandwidth from path j, e.g., available bandwidth divided by number of paths in set S of paths. If (at block 908) the increased allocated bandwidth for path k exceeds the minimum per path allocated bandwidth i for all links i in path k, then the path information $300_k$ for path k is updated (at block 910) to the increased allocated bandwidth and the link information $400_i$ for all links in path k is updated to reflect the increased allocated bandwidth. All source nodes $200_i$ are notified (at block 912) of the updated allocated bandwidth for the destination node. If (at block 908) the increased allocated bandwidth for path k does not exceed the minimum per path allocated bandwidth for all links in path k, then there is no increase in the allocated bandwidth. From block 912 or the NO branch of block 908, control proceeds to block 914 to consider another path include a link in path j until all such paths are considered.

With the embodiment of FIG. 9, nodes 200$_i$ may report to the network manager 112 when they have a new transmission rate which is lower than the initially allocated transmission rate. The network manager 112 may then determine how to redistribute any additional bandwidth resulting from the new lower transmission rate to other paths that may use the difference between the reduced new transmission rate and the previously allocated bandwidth. Hence, with the embodiment of FIG. 9, the network manager 112 will redistribute bandwidth to a set of paths S having common links to the path with the new lower transmission rate in a manner that avoids congestion and efficiently utilizes available capacity.

Figure 10:
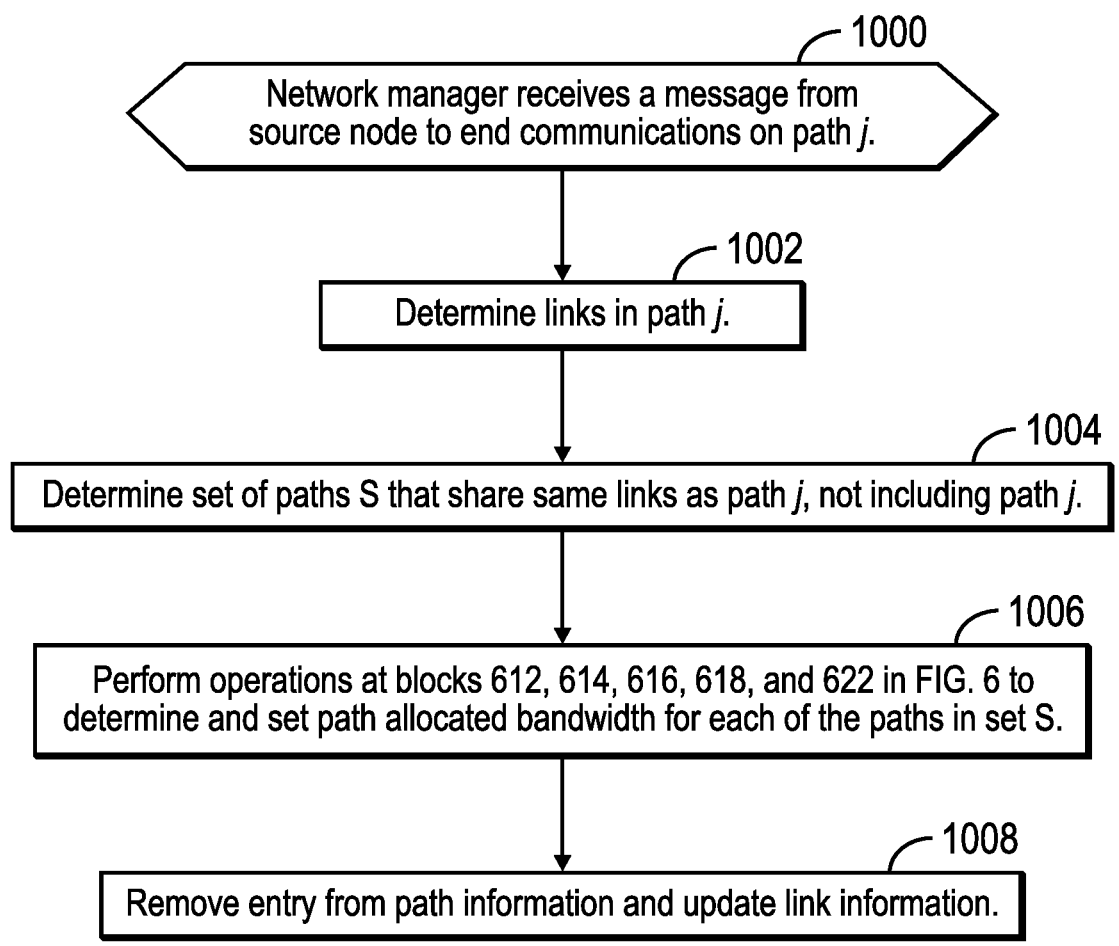
FIG. 10 illustrates an embodiment of operations at the manager node to remove an entry in the path information for a path between a source node and destination node.

FIG. 10 illustrates an embodiment of operations performed by the network manager 112 to remove a path j and redistribute the bandwidth from removed path j to the remaining paths in set S that has common links with path j. Prior to the operations of FIG. 10, the node network agent 202 on a source node 200$_i$ would receive a message from an application executing in the node 200$_i$ to end communications to a destination node on path j. The node network agent 202 would remove the entry in the node agent path information 500$_j$ for the path j and notify the network manager 112 to end communications with the destination node, which notification triggers the operations of FIG. 10.

Upon receiving (at block 1000) a message from a source node 200$_i$ that the source node 200$_i$ no longer communicates on path j, the network manager 112 determines (at block 1002) all links in path j to remove. A determination is made (at block 1004) of a set of paths S that share same links as path j, excluding path j. The network manager 112 performs (at block 1006) the operations at blocks 612-622 in FIG. 6 to determine and set path allocated bandwidth for each of the paths in set S. The entry 300$_j$ for path j is removed (at block 1008) from the path information 300 and the link information 400 is updated.

With the embodiment of FIG. 10, when a communication path is removed because it is no longer used by a source node 200$_i$ then the allocated bandwidth 310 to the removed path j may be redistributed among other remaining paths in a manner that utilizes available capacity and prevents network congestion.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, including a network manager 112 allocating bandwidth to nodes in a network to avoid transmissions from the nodes on paths that exceed capacity of links in the paths to avoid network congestion. In addition to block 112, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 112, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

Figure 11:
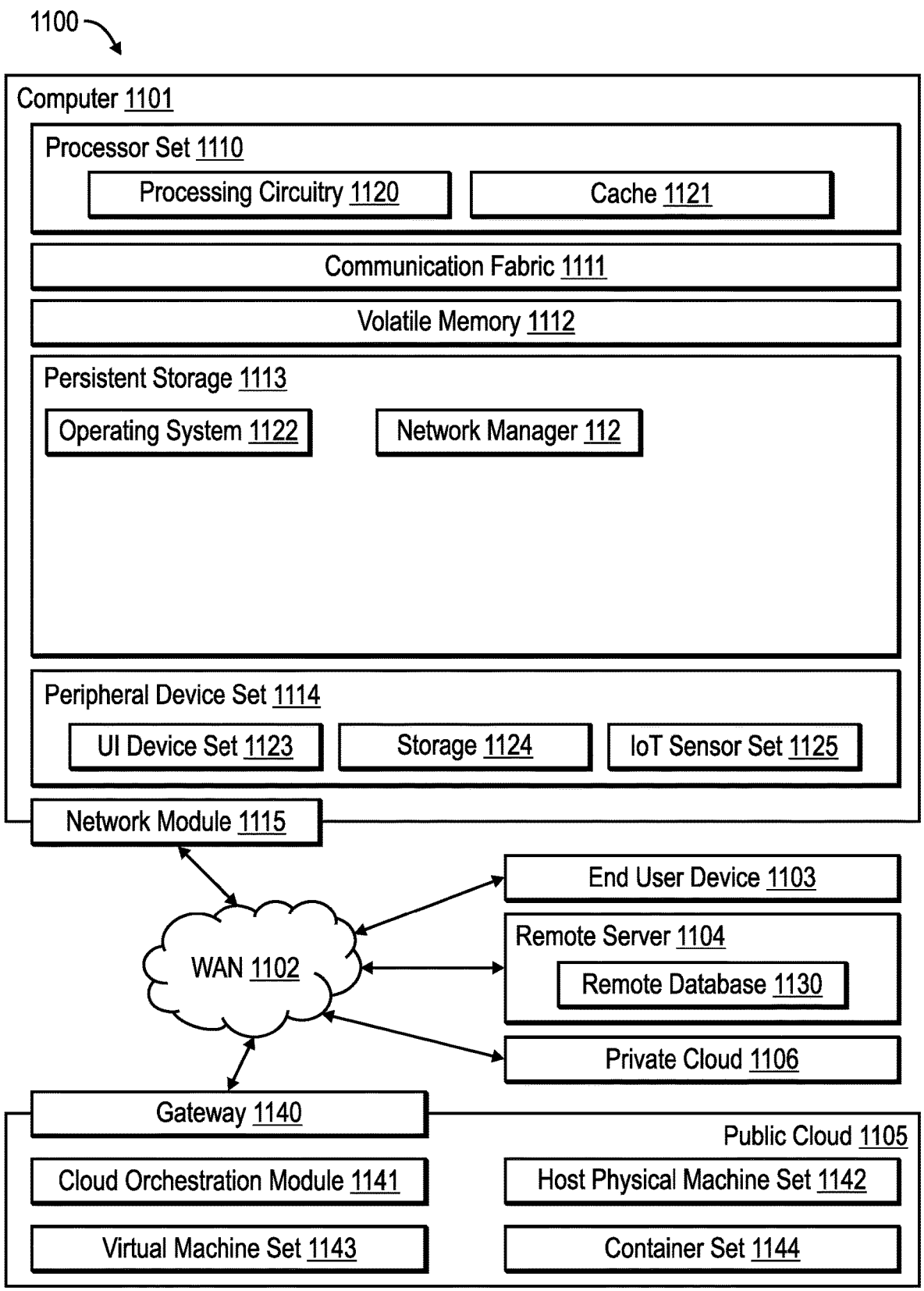
FIG. 11 illustrates a computing environment in which the components of FIG. 1 may be implemented.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 12 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 112 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115. The network manager 112 may be implemented in the network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on. The nodes $200_i$ may comprise the EUDs 1103 that receive allocated bandwidth from the network manager 112 running in the computer 1101.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104. The path information 300 and the link information 400 may be implemented in a remote database 1130 and accessed by the network manager 112 to use to allocate bandwidth to paths used by the nodes $200_i$ or EUDs 1103.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for allocating bandwidth to nodes in a network, the computer program product comprising a computer readable storage medium having computer readable program code embodied therein that when executed performs operations, the operations comprising:
   receiving a request from a source node of the nodes to communicate with a destination node;
   selecting a path between the source node and the destination node;
   for a link of the links in the selected path, performing:
      determining a number of common paths that include the link, wherein the common paths include the selected path; and
      determining a per path allocated bandwidth for the link as a function of a bandwidth of the link and the number of common paths that share the link;
   setting allocated bandwidth for the selected path to a minimum of per path allocated bandwidths for the links in the selected path; and
   transmitting information on the selected path and the allocated bandwidth to the source node to use to communicate with the destination node.

2. The computer program product of claim 1, wherein the operations further comprise:
   for each common path of the common paths, setting allocated bandwidth for the common path to a minimum of per path allocated bandwidths for links in the common path; and
   transmitting information on the allocated bandwidth to source nodes using the common paths if the allocated bandwidth has changed for a common path.

3. The computer program product of claim 1, wherein the operations further comprise:
   receiving available capacity for the destination node when the destination node connects to the network, wherein the available capacity of the destination node comprises an upper bound on the allocated bandwidth for the selected path.

4. The computer program product of claim 1, wherein the per path allocated bandwidths for the links in the selected path comprises, for each link, a capacity of the link divided by the number of common paths using the link.

5. The computer program product of claim 1, wherein the transmitting information on the allocated bandwidth and the selected path to the source node causes the source node to perform operations, the operations comprising:
   distributing the allocated bandwidth to processes in the source node that communicate on the selected path, wherein different processes are allocated different amounts of the allocated bandwidth to communicate to the destination node on the selected path.

6. The computer program product of claim 1, wherein the transmitting information on the allocated bandwidth at the source node causes the source node to perform operations, the operations comprising:
   detecting a reduction in transmission rate by at least one process communicating to the destination node;
   updating a transmission rate and allocated capacity for the destination node to reflect the reduction in the transmission rate; and
   transmitting the updated transmission rate to a network manager, wherein the network manager redistributes bandwidth allocated to the selected path and the common paths based on the updated transmission rate.

7. The computer program product of claim 1, wherein the operations further comprises:
   receiving a message from a source node of an updated transmission rate less than a previously allocated transmission rate for the selected path;
   determining per path allocated bandwidths for links in the selected path based on a number of common paths that share a link with the selected path;
   setting allocated bandwidth for the selected path to a minimum of the per path allocated bandwidths for the links in the selected path;
   determining increased allocated bandwidths for the common paths including a portion of bandwidth from the selected path;
   determining whether increased allocated bandwidth for the common paths exceeds minimum per path bandwidths for the links of the common paths; and
   updating allocated bandwidth for a common path to the increased allocated bandwidth in response to determining that the increased allocated bandwidth does not exceed the minimum per path bandwidth for the common path.

8. The computer program product of claim 1, wherein the operations further comprises:
   receiving a message from a source node to end communication on the selected path;
   determining adjusted per path allocated bandwidths for links in the selected path to remove based on a number of the common paths;
   for each common path of the common paths, setting adjusted allocated bandwidth for the common path to a minimum of per path allocated bandwidths for links in the common path including links having the determined adjusted per path allocated bandwidths; and
   transmitting information on the adjusted allocated bandwidth to source nodes using the common paths if the adjusted allocated bandwidth differs from previously allocated bandwidth.

9. A system for allocating bandwidth to nodes in a network, comprising:
   a processor; and
   a computer readable storage medium having computer readable program code embodied therein that when executed by the processor performs operations, the operations comprising:
      receiving a request from a source node of the nodes to communicate with a destination node;
      selecting a path between the source node and the destination node;

for a link of the links in the selected path, performing:
    determining a number of common paths that include the link, wherein the common paths include the selected path; and
    determining a per path allocated for the link as a function of a bandwidth of the link and the number of common paths that share the link with the selected path;
setting allocated bandwidth for the selected path to a minimum of per path allocated bandwidths for the links in the selected path; and
transmitting information on the selected path and the allocated bandwidth to the source node to use to communicate with the destination node.

10. The system of claim 9, wherein the operations further comprise:
for each common path of the common paths, setting allocated bandwidth for the common path to a minimum of per path allocated bandwidths for links in the common path; and
transmitting information on the allocated bandwidth to source nodes using the common paths if the allocated bandwidth has changed for a common path.

11. The system of claim 9, wherein the operations further comprise:
receiving available capacity for the destination node when the destination node connects to the network, wherein the available capacity of the destination node comprises an upper bound on the allocated bandwidth for the selected path.

12. The system of claim 9, wherein the transmitting information on the allocated bandwidth and the selected path to the source node causes the source node to perform operations, the operations comprising:
distributing the allocated bandwidth to processes in the source node that communicate on the selected path, wherein different processes are allocated different amounts of the allocated bandwidth to communicate to the destination node on the selected path.

13. The system of claim 9, wherein the transmitting information on the allocated bandwidth at the source node causes the source node to perform operations, the operations comprising:
detecting a reduction in transmission rate by at least one process communicating to the destination node;
updating a transmission rate and allocated capacity for the destination node to reflect the reduction in the transmission rate; and
transmitting the updated transmission rate to a network manager, wherein the network manager redistributes bandwidth allocated to the selected path and the common paths based on the updated transmission rate.

14. The system of claim 9, wherein the operations further comprises:
receiving a message from a source node of an updated transmission rate less than a previously allocated transmission rate for the selected path;
determining per path allocated bandwidths for links in the selected path based on a number of common paths that share a link with the selected path;
setting allocated bandwidth for the selected path to a minimum of the per path allocated bandwidths for the links in the selected path;
determining increased allocated bandwidths for the common paths including a portion of bandwidth from the selected path;
determining whether increased allocated bandwidth for the common paths exceeds minimum per path bandwidths for the links of the common paths; and
updating allocated bandwidth for a common path to the increased allocated bandwidth in response to determining that the increased allocated bandwidth does not exceed the minimum per path bandwidth for the common path.

15. A method for allocating bandwidth to nodes in a network, comprising:
receiving a request from a source node of the nodes to communicate with a destination node;
selecting a path between the source node and the destination node;
for a link of the links in the selected path, performing:
    determining a number of common paths that include the link, wherein the common paths include the selected path; and
    determining a per path allocated bandwidth for the link as a function of a bandwidth of the link and number of common paths that share the link;
setting allocated bandwidth for the selected path to a minimum of per path allocated bandwidths for the links in the selected path; and
transmitting information on the selected path and the allocated bandwidth to the source node to use to communicate with the destination node.

16. The method of claim 15, further comprising:
for each common path of the common paths, setting allocated bandwidth for the common path to a minimum of per path allocated bandwidths for links in the common path; and
transmitting information on the allocated bandwidth to source nodes using the common paths if the allocated bandwidth has changed for a common path.

17. The method of claim 15, further comprising:
receiving available capacity for the destination node when the destination node connects to the network, wherein the available capacity of the destination node comprises an upper bound on the allocated bandwidth for the selected path.

18. The method of claim 15, wherein the transmitting information on the allocated bandwidth and the selected path to the source node causes the source node to perform operations comprising:
distributing the allocated bandwidth to processes in the source node that communicate on the selected path, wherein different processes are allocated different amounts of the allocated bandwidth to communicate to the destination node on the selected path.

19. The method of claim 15, wherein the transmitting information on the allocated bandwidth at the source node causes the source node to perform operations comprising:
detecting a reduction in transmission rate by at least one process communicating to the destination node;
updating a transmission rate and allocated capacity for the destination node to reflect the reduction in the transmission rate; and
transmitting the updated transmission rate to a network manager, wherein the network manager redistributes bandwidth allocated to the selected path and the common paths based on the updated transmission rate.

20. The method of claim 15, further comprising:
receiving a message from a source node of an updated transmission rate less than a previously allocated transmission rate for the selected path;

determining per path allocated bandwidths for links in the selected path based on a number of common paths that share a link with the selected path;

setting allocated bandwidth for the selected path to a minimum of the per path allocated bandwidths for the links in the selected path;

determining increased allocated bandwidths for the common paths including a portion of bandwidth from the selected path;

determining whether increased allocated bandwidth for the common paths exceeds minimum per path bandwidths for the links of the common paths; and updating allocated bandwidth for a common path to the increased allocated bandwidth in response to determining that the increased allocated bandwidth does not exceed the minimum per path bandwidth for the common path.

* * * * *